(12) United States Patent
Vezzoli

(10) Patent No.: US 10,160,044 B2
(45) Date of Patent: Dec. 25, 2018

(54) BLOCKING DEVICE OF TOOL-HOLDER ON LATHES

(71) Applicant: ALGRA S.P.A., Val Brembilla (BG) (IT)

(72) Inventor: Giovanni Vezzoli, Val Brembilla (IT)

(73) Assignee: ALGRA S.P.A., Val Brembilla (BG) (IT)

( * ) Notice: Subject to any disclaimer, the term of this patent is extended or adjusted under 35 U.S.C. 154(b) by 0 days.

(21) Appl. No.: 15/890,659

(22) Filed: Feb. 7, 2018

(65) Prior Publication Data

US 2018/0221965 A1  Aug. 9, 2018

(30) Foreign Application Priority Data

Feb. 7, 2017  (IT) .................. 102017000013072

(51) Int. Cl.
| | |
|---|---|
| *B23B 31/00* | (2006.01) |
| *B23B 31/107* | (2006.01) |
| *B23B 29/04* | (2006.01) |
| *B23Q 3/155* | (2006.01) |
| *B23B 29/12* | (2006.01) |

(52) U.S. Cl.
CPC ........ *B23B 31/1077* (2013.01); *B23B 29/046* (2013.01); *B23B 29/12* (2013.01); *B23B 31/107* (2013.01); *B23Q 3/15506* (2013.01); *B23Q 3/15533* (2013.01); *B23Q 3/1556* (2013.01); *B23Q 2003/15528* (2016.11)

(58) Field of Classification Search
CPC . B23B 31/113; B23B 31/1077; B23B 31/107; B23B 2231/0204; B23B 2231/028; B23B 2231/0284; B23B 2231/0296; B23Q 7/046; B23Q 5/585; B23Q 13/00
See application file for complete search history.

(56) References Cited

U.S. PATENT DOCUMENTS

| | | | | |
|---|---|---|---|---|
| 1,374,399 | A * | 4/1921 | Shailor | B23B 31/113 |
| | | | | 279/77 |
| 2,773,693 | A * | 12/1956 | Chittenden | B23B 31/113 |
| | | | | 279/48 |
| 5,873,682 | A * | 2/1999 | Tripsa | B23B 29/046 |
| | | | | 407/101 |
| 7,112,020 | B2 * | 9/2006 | Sheffler | B23B 31/005 |
| | | | | 279/83 |
| 8,308,403 | B2 * | 11/2012 | Hecht | B23B 29/04 |
| | | | | 279/77 |
| 9,839,965 | B2 * | 12/2017 | Englund | B23B 31/4006 |
| 2013/0034393 | A1 * | 2/2013 | Hecht | B23B 29/046 |
| | | | | 407/101 |

\* cited by examiner

*Primary Examiner* — Will Fridie, Jr.
(74) *Attorney, Agent, or Firm* — Abelman, Frayne & Schwab

(57) ABSTRACT

A blocking device of tool-holders on lathes, especially for the rapid and precise blocking of tool-holders on CNC (Computer Numerical Control), single spindle or multi-spindle lathes as well as on transfer machines, milling centres of any kind and, in general, on machine tools which perform machining by chip removal, is paired with a tool-holder, motorized or non-motorized, connected to the existing support on said lathes and comprises an anchoring pawl provided with a female truncated-cone shaped recess. Said pawl is moved vertically with respect to the longitudinal axis of said tool-holder by mechanical or hydraulic means driven to engage said female, truncated-cone shaped recess with an inclined, male truncated-cone appendage made on said tool-holder.

10 Claims, 3 Drawing Sheets

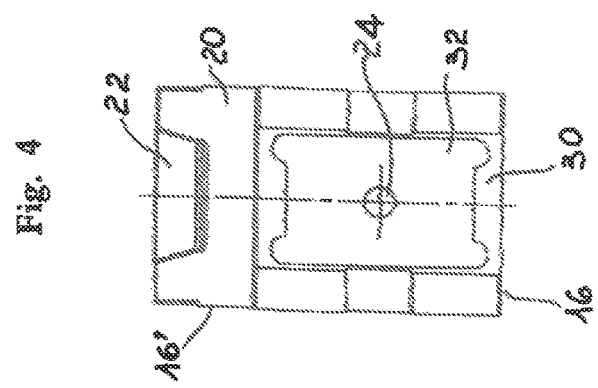
Fig. 4
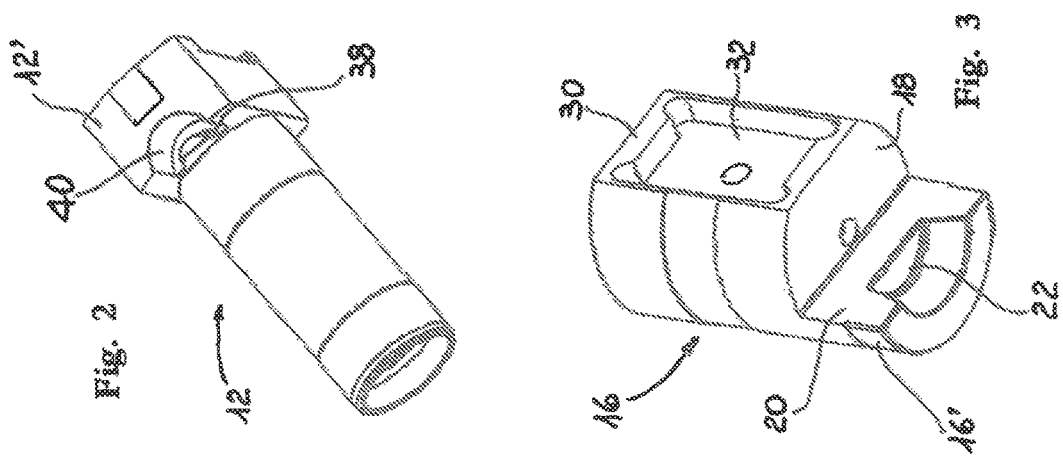
Fig. 2
Fig. 3
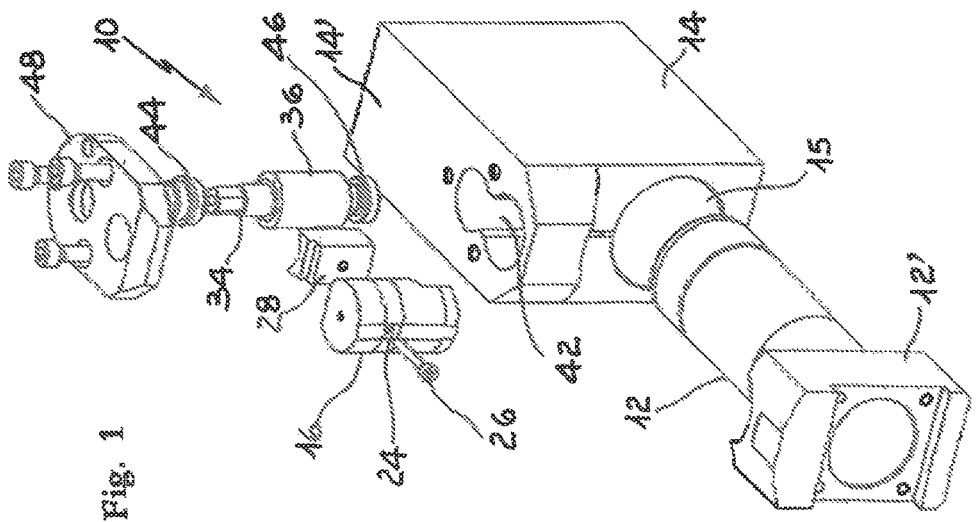
Fig. 1

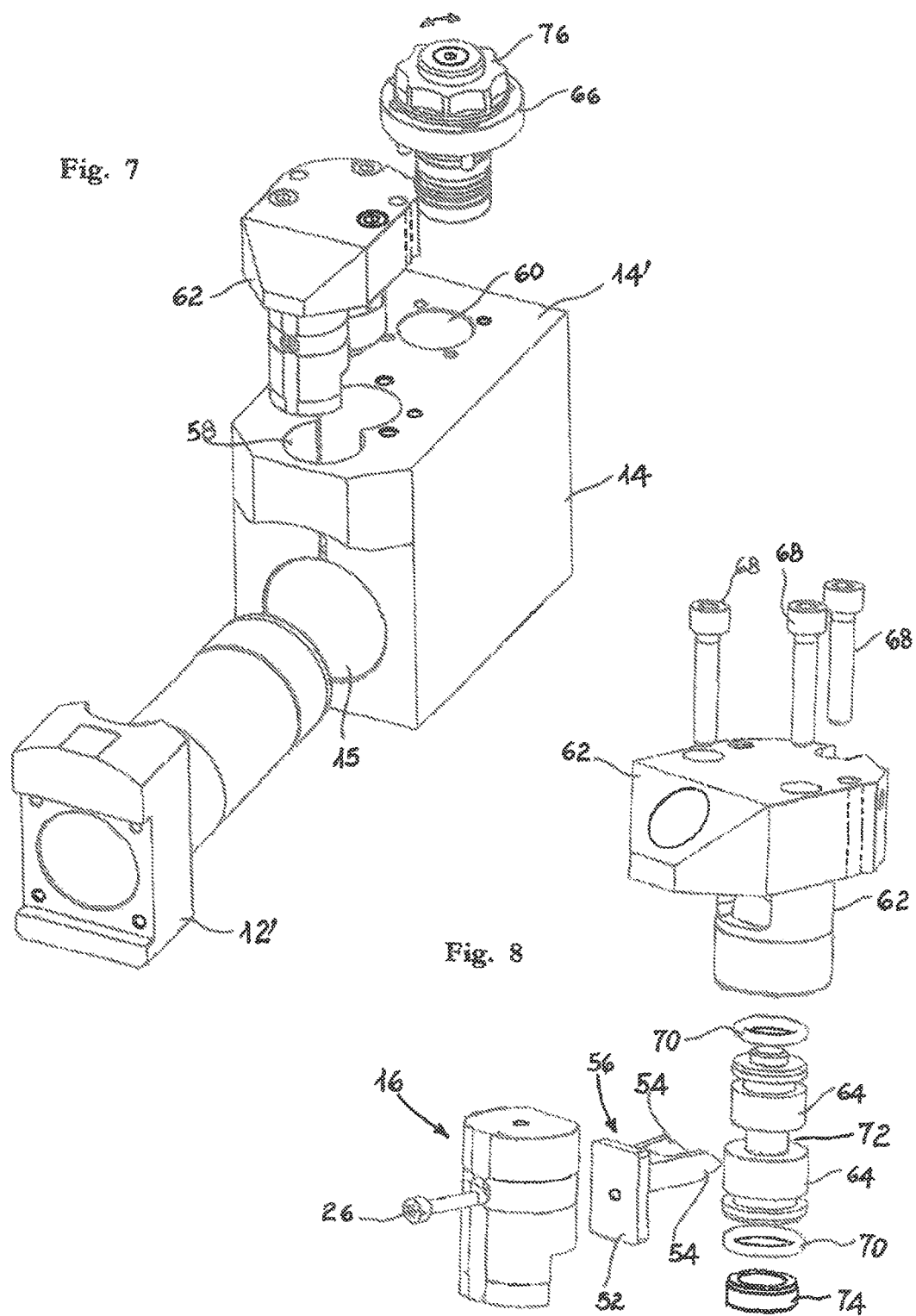

BLOCKING DEVICE OF TOOL-HOLDER ON LATHES

CROSS REFERENCE TO RELATED APPLICATIONS

This application claims priority to IT patent application No. 102017000013072, filed Feb. 7, 2017, which is incorporated herein by reference thereto.

FIELD OF THE INVENTION

The present invention relates to a blocking device of tool-holders on lathes.

More in particular, the present invention relates to a device for the rapid and precise blocking of tool-holders on CNC (Computer Numerical Control), single spindle or multi-spindle lathes as well as on transfer machines, milling centres of any kind and, in general, on machine tools which perform machining with chip removal.

BACKGROUND OF THE INVENTION

As is known, in the sphere of mechanical machining performed with numerical control lathes, there is a need to frequently replace the various modules in the course of machining. To perform such changeover operations of the equipment downtime occurs, during which machine operations must necessarily be suspended for a certain period. In addition to this, the set-up times for each tool change should be considered. In the case of machinery capable of using multiple tool-holders, intervention on multiple screws is required for blocking and centring positioning. These repeated manual operations altogether give rise to significant increases in production costs.

WO 01/15841 divulges a device suitable to block tool-holders for lathes, in which there is a truncated-cone element with an anchoring pawl which, to perform the blocking, moves vertically in relation to the longitudinal axis of said tool-holders.

SUMMARY OF THE DISCLOSURE

The purpose of the present invention is to overcome the drawbacks complained of above.

More in particular, the purpose of the present invention is to provide a device for blocking tool-holders to lathes, especially multi-spindle or single-spindle CNC lathes which makes the replacement of said tool-holders extremely quick and easy.

A further purpose of the invention is to provide a device as defined above which makes it possible to perform automatic and targeted centring of the tool-holder, avoiding the need for laborious adjustments in terms of orientation after its replacement.

A further purpose of the invention is to make available to users a device for blocking tool-holders to lathes suitable to ensure a high level of resistance and reliability over time, in addition such as to be easily and economically made.

These and other purposes are achieved by the device for blocking tool-holders to lathes of the present invention according to the main claim.

BRIEF DESCRIPTION OF THE DRAWINGS

The construction and functional characteristics of the device for blocking tool-holders to lathes of the present invention will be more clearly comprehensible from the detailed description below in which reference is made to the appended drawings which show a preferred and non-limiting embodiment and wherein:

FIG. 1 represents schematically, an exploded view of the device according to the invention, paired with the tool-holder and existing support on the lathe;

FIG. 2 schematically represents, in an axonometric view, the tool-holder according to a different angle with respect to the illustration in FIG. 1;

FIG. 3 represents an enlarged axonometric view from a different angle of a component of the device according to the invention, destined to co-operate with said tool-holder;

FIG. 4 schematically represents the front view of a recessed portion of the component in FIG. 3;

FIG. 7 represents schematically, in an exploded view, the device of the invention according to an alternative embodiment, paired with the tool holder and existing support on the lathe;

FIG. 8 shows schematically, in an exploded view, a part of the device in FIG. 7.

DETAILED DESCRIPTION OF THE INVENTION

Figure 5:
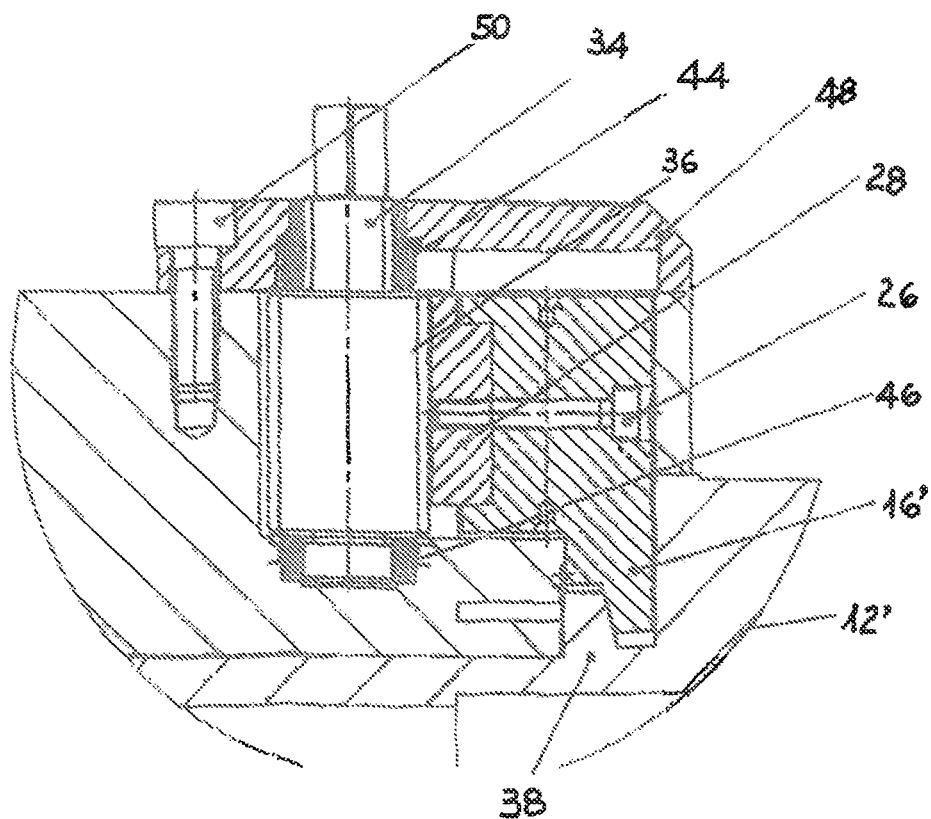
FIG. 5 represents schematically a vertical section of the support of the lathe in FIG. 1, to highlight the blocking device of the invention placed therein.
Figure 6:
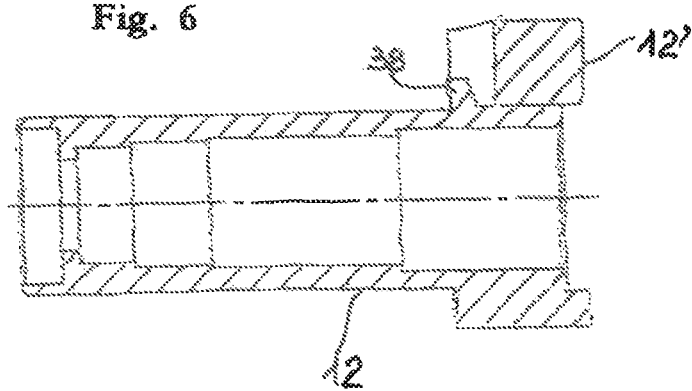
FIG. 6 represents schematically a longitudinal cross-section of the tool-holder in FIG. 2.

With initial reference to FIGS. 1 to 3, the device for blocking the tool-holder of the present invention, especially suitable for multi-spindle or single-spindle CNC lathes, globally denoted by reference numeral 10 in FIG. 1, is by way of example, paired with a tool-holder 12, motorized or non-motorized, intended to be connected to the support 14 existing on lathe (not shown). Said blocking device comprises an anchoring pawl 16 defined by a substantially cylindrical body, a face of which is devoid of a diametrical half-part and forms a substantially semi-circular plane 18. The remaining diametrical half-part of the pawl 16, indicated by reference number 16' comprises a vertical wall 20, orthogonal with respect to said plane 18, on which a female truncated-cone shaped recess 22 is made: the recess 22 extends from the top of the vertical wall 20 for a height roughly equal to half the height of said wall. The anchoring pawl 16 has a transversal through hole 24 which a screw 26 is inserted in, connecting said pawl to an irregular, prism-shaped element 28 or threaded lead screw with an inner trapezoidal thread. On a portion of the anchoring pawl 16 a flattening 30 is made which receives a lowered imprint 32, as shown in detail in FIG. 4; said imprint defines a profile and an extension complementary to the shape of the element 28 which positions itself exactly in the imprint, to be firmly connected without the possibility of angular movements to the pawl 16 by means of the screw 26 mentioned.

The blocking device of the invention further comprises a nut screw 34 provided with an external trapezoidal thread along a portion thereof 36 of greater diameter; the inner trapezoidal thread of the element 28, or threaded lead screw, is destined to face the external trapezoidal thread, made on the part 36 of the nut screw 34 and to engage with it as further specified in relation to the operation of said device. The tool-holder 12, forming part of the device of the invention, is equally provided in its rear part constituting the attachment anchored to the lathe and indicated by reference numeral 12' in FIGS. 1 and 2, with a truncated-cone shaped recess 40, advantageously made by means of a double perforation of different diameters in a vertical direction on said part 12'. At the base of the recess 40, as can be seen in particular in FIG. 2, the formation of a collar appendage 38 of a truncated-cone shape results, destined to engage in the truncated-cone recess 22 of the anchoring pawl 16, to be enclosed thereby.

In the support 14 existing on the lathe, the tool-holder 12 is inserted in a known manner through a lateral opening 15; said support 14 accommodates the anchoring pawl 16 and, adjacent thereto, the nut screw 36, being provided for the purpose along its upper face, indicated as 14' in FIG. 1, with a shaped opening 42; in the cavity defined in the support 14, the pawl 16 and the nut screw 34 are inserted vertically and stabilized with known means at a predetermined height so that the female truncated-cone recess 22 of the anchoring pawl 16 and the male truncated-cone appendage 38 of the truncated-cone recess 40 of the attachment 12' overlap and may be mutually engaged. This happens at the moment in which the pawl 16 is made to lower. The movement of the anchoring pawl 16 downwards or upwards is imposed by the rotation of the nut screw 34 performed with a generic wrench or a torque wrench starting from its upper end which protrudes from the upper face 14' of the support 14. The rotation in one direction of said screw 34 drives the threaded portion 36 to move the anchoring pawl 16, via the element 28 or threaded lead screw which it is engaged to, driving it downwards or upwards; when it descends, said pawl 16 locks the tool-holder 12, as shown in FIG. 5, since the male truncated-cone appendage 38 of the latter places itself adjacent to the female truncated-cone recess 22 of the anchoring pawl 16 and following the same rotation of the screw 34, is delimited by it, leading to the blocking. Said rotation is preferably limited to one two revolutions, the vertical excursion that the pawl 16 must fulfil being equal to a few millimetres; it follows that both the blocking and unblocking of the tool-holder 12, and its orientation, are extremely fast. The nut screw 34 is preferably paired with opposite upper 44 and lower bushings 46, visible in FIG. 1. A cover 48 is preferably provided to close the upper face of the support 14 at the shaped opening 42, so as to prevent foreign bodies such as swarf or traces of mineral oils from entering said support which could jeopardize the proper functioning of the device of the invention. Said cover, which the end of the nut screw 34 protrudes from to allow the movement thereof, is fixed to the support 14 with screws 50 or equivalent retention means.

FIGS. 7 and 8 refer to an alternative embodiment of the device for blocking tool-holders to lathes according to the present invention. In this hypothesis, in which the same numbers will be used as in the previous solution to indicate common components, said blocking device is activated hydraulically rather than mechanically. The anchoring pawl 16 remains unchanged, but the recess 32 which it is provided with along the flattening 30 houses a plate 52 to which two arms 54 are attached, paired in a horizontal direction; the plate 52 and arms 54 altogether define a fork 56. In this case the screw 26 connects the pawl 16 to the fork 56. The upper face 14' of the support 14 existing on the lathe is provided with two shaped openings, respectively indicated as 58 and 60, in which the means for moving the anchoring pawl 16 in a vertical direction are positioned, according to this alternative embodiment. Such means comprise a sleeve 62 incorporating a hydraulic actuator 64 in itself known, and a flow diverter hydraulic valve 66, appropriately powered. Two or more screws 68 fix the sleeve 62 to the upper face 14' of the support 14; the hydraulic valve 66 provided with an actuator knob 76, is fixed in a similar manner to said support. The sleeve 62 holds in position and guides the hydraulic actuator 64 during its linear movement and integrates the passages of the control fluid directed through the valve 66 in order to allow the exchange of said fluid and to move said actuator in both operating directions. The rotation of 90° of the knob 76 of the valve 66 by the operator replacing the tool-holder 12 achieves such result, which leads rapidly to the lifting or lowering of the pawl 16, as specified in detail below. The hydraulic actuator 64, in the preferred embodiment shown in FIG. 8, is composed of a cylindrical body in which two seats are preferably provided for housing as many O-rings 70 that prevent leakage of the fluid which actuates said actuator. On said cylindrical body of the actuator 64 a channel 72 is made in a substantially central position which defines the seat which the arms 54 of the fork 56 abut in. In practice, the fork 56 is firmly engaged with the hydraulic actuator 64 starting from said arms, while the tool-holder 12 is engaged in the support 14 of the lathe through the opening 15 of the support 14, in a known manner and similarly to the solution described earlier. A bushing 74, placed below the actuator 64, acts as a damper of said actuator when it reaches the end stroke. The truncated-cone female recess 22 of the anchoring pawl 16 and the complementary male truncated-cone appendage 40 made on the part 12' of the tool holder 12 are also present in this embodiment, identically to what was specified in relation to the previously described solution.

In the operating phase, the rotation clockwise or anti-clockwise of the aforementioned knob 76 by 90° moves the hydraulic actuator 64 upwards or downwards; as a result, by means of the arms 54 of the fork 56 engaged in the groove 72 of said actuator, the anchoring pawl 16 is alternately driven to rise or fall. In the first case, said pawl drives the truncated-cone recess 22 to couple with the inclined, male truncated-cone appendage 38 of the recess 40 made on the part 12' of the tool holder 12 and realizes at the same time both the orientation and the blocking of said tool-holder; in the second case, when the hydraulic actuator 64 makes the anchoring pawl 16 descend by means of the arms 54 of the fork 56, the truncated-cone recess 22 disengages from the inclined, male truncated-cone appendage 38 of the recess 40, made on the part 12' of the tool holder 12, and releases the tool-holder 12 which can then be extracted from the support 14 for its rapid replacement.

As may be seen from the above, the advantages which the invention achieves are evident.

Both in the case of a mechanical movement of the anchoring pawl 16 according to the first embodiment described above, and in the case of a hydraulic movement of said pawl, according to the alternative embodiment just described, the replacement and the automatic and targeted centring of the tool-holder 12 on lathes of any kind, in particular on CNC lathes, can be achieved in a very short time, also avoiding the need for laborious adjustments in terms of orientation after replacement. In fact, thanks to the provision of a coupling along truncated-cone portions, the replacement and subsequent orientation, blocking and precise positioning in the four degrees of movement of the "X", "Y", "Z" and angular axes of the replacement tool-holders 12, whether motorized or non-motorized, are achieved quickly and in an extremely easy manner, to the benefit of a substantial reduction of the downtimes of processing and consequently of production costs.

Despite the invention having been described above with reference to one of its possible embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

The invention claimed is:

1. A device (10) for blocking tool-holders on lathes, in particular for the rapid and precise blocking of tool-holders on CNC (Computer Numerical Control), single spindle or multi-spindle, lathes as well as on transfer machines, milling centres of any kind and, in general, on machine tools which perform machining with chip removal, paired with a tool-holder (12) motorised or non-motorised connected to the support (14) existing on said lathes, characterised in that it comprises an anchoring pawl (16) with a female, truncated-cone shaped recess (22) moved vertically with respect to the longitudinal axis of said tool-holder (12) by mechanical or hydraulic means to drive said pawl to engage said female, truncated-cone shaped recess (22) it is provided with, in an inclined, male truncated-cone appendage (38) made on said tool-holder (12).

2. The device for blocking tool-holders according to claim 1, characterised in that the anchoring pawl (16) comprises a generally semi-circular plane (18) and a vertical wall (20), perpendicular to said plane (18), on which said recess (22) is made.

3. The device for blocking tool-holders according to claim 1, characterised in that said inclined, male truncated-cone appendage (38) is made at a truncated-cone recess (40) made on the attachment (12') of the tool-holder (12) and projects from the bottom of said truncated-cone recess (40).

4. The device for blocking tool-holders according to claim 1, characterised in that said mechanical devices suitable to move the anchoring pawl (16) vertically comprise an irregular prism-shaped element (28) or threaded lead screw with trapezoidal inner thread, cooperating with a nut screw (34) having an outer trapezoidal thread along the part thereof (36) with a larger diameter.

5. The device for blocking tool-holders according to claim 2, characterised in that the anchoring pawl (16) has a transverse through hole (24) in which a screw (26) is inserted connecting the pawl to said irregular prismatic element (28).

6. The device for blocking tool-holders according to claim 5, characterised in that the anchoring pawl (16) has a flattening (30) on which a recessed imprint (32) is made having a profile and extension complementary to the shape of said element (28).

7. The device for blocking tool-holders according to claim 1, characterised in that the support (14) receives the anchoring pawl (16) and next to it the nut screw (34), being provided for the purpose along its upper face (14') with a shaped opening (42), said pawl (16) and nut screw (34) being placed in the support (14) at a predetermined height so that the female truncated-cone recess (22) of the anchoring pawl (16) and the male truncated-cone appendage (38) of the truncated-cone recess (40) of the attachment (12') engage each other following a vertical movement of said pawl.

8. The device for blocking tool-holders according to claim 4, characterised in that the upper end of the nut screw (34) protrudes from the upper face (14') of the support (14) said latter being surmounted by a cover (48).

9. The device for blocking tool-holders according to claim 1, characterised in that said hydraulic means suitable to move the anchoring pawl (16) vertically comprise a sleeve (62) incorporating a hydraulic actuator (64) and a flow diverter hydraulic valve (66) with actuator knob (76), placed in the existing support (14) on lathes starting from two shaped openings (58) and (60) made along the upper face (14') of said support.

10. The device for blocking tool-holders according to claim 9, characterised in that the hydraulic actuator (64) is provided with a groove (72) in which opposite arms (54) of a fork (52) are inserted comprising a plate (52) having a profile and extension complementary to the shape of said element (28).

* * * * *